(12) United States Patent
Mitake

(10) Patent No.: US 6,308,987 B1
(45) Date of Patent: *Oct. 30, 2001

(54) CANISTER ATTACHMENT CONSTRUCTION OF A VEHICLE

(75) Inventor: Akitoshi Mitake, Shizuoka-Ken (JP)

(73) Assignee: Suzuki Motor Corporation (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/447,488

(22) Filed: Nov. 23, 1999

(30) Foreign Application Priority Data

Dec. 9, 1998 (JP) .................................. 10-368551

(51) Int. Cl.⁷ ...................................................... B60P 3/99
(52) U.S. Cl. ............................................................ 280/834
(58) Field of Search .................................................. 280/834

(56) References Cited

U.S. PATENT DOCUMENTS

| | | | |
|---|---|---|---|
| 4,550,923 | * 11/1985 | Ogawa et al. | 280/834 |
| 5,024,687 | * 6/1991 | Waller | 55/316 |
| 5,111,900 | * 5/1992 | Leitermann | 280/834 |
| 5,195,780 | * 3/1993 | Inoue et al. | 280/834 |
| 5,409,264 | * 4/1995 | Nakatani | 280/834 |
| 5,782,258 | * 7/1998 | Herbon et al. | 137/43 |
| 5,868,428 | * 2/1999 | Ishikawa | 280/834 |
| 5,970,958 | * 10/1999 | DeLand et al. | 123/520 |

FOREIGN PATENT DOCUMENTS 5-193522   8/1993   (JP) .

\* cited by examiner

Primary Examiner—J. J. Swann
Assistant Examiner—L. Lum
(74) Attorney, Agent, or Firm—Morrison Law Firm

(57) ABSTRACT

A canister for the recovery of evaporated fuel in a fuel tank of a vehicle is positioned in a central region of a vehicle. The vehicle body frame includes left and right side frames attached with a plurality of cross members. The canister is positioned behind a central cross member at a side opposite of an exhaust pipe running from the vehicle engine toward the rear of the vehicle. By attaching the canister in this location, a vapor pipe connecting the canister with the fuel tank is shortened, resulting in a more adequate recovers of evaporated fuel. Additionally, a canister placed in this location, is made larger, further increasing the adequacy of evaporated fuel recovery. Furthermore, as opposed to conventional canisters being located in the engine compartment, a canister located behind the central cross member is not effected by warming caused by the engine. The result is a canister having excellent performance in the recovery of evaporated fuel from the fuel tank of a vehicle.

8 Claims, 5 Drawing Sheets

CANISTER ATTACHMENT CONSTRUCTION OF A VEHICLE

BACKGROUND TO THE INVENTION

The present invention relates to a canister attachment construction of a vehicle. In particular, the present invention relates to a canister attachment construction, wherein the canister is installed on the right side of the vehicle in a region surrounded by a central cross member, which is positioned at approximately the central region of the vehicle frame, a cross member that is positioned behind this central cross member, and a side frame. The present inventions relates to a canister attachment construction wherein the length of the vapor pipe, which connects the canister to the fuel tank, is shortened. Furthermore, the present invention relates to a canister attachment construction wherein the canister is made larger in order to ensure an adequate adsorption amount. Since the canister of the present invention is not placed in the engine compartment of the vehicle, the engine compartment is simplified, and there is no risk of reduced adsorptive function due to warming of the canister.

A conventional vehicle has a canister to sorb and retain evaporated fuel generated inside a fuel tank. The canister supplies this retained evaporated fuel to the intake system of an internal combustion engine.

The canister is controlled so that, for example, when the internal combustion engine is stopped, the canister sorbs and retains evaporated fuel which is generated inside a fuel tank. In addition, when the internal combustion engine is running, the evaporated fuel that has been sorbed and retained is released supplied to the intake system of the internal combustion engine.

A conventional vehicle canister attachment construction described above is disclosed in Japanese Laid-Open Patent Publication No. 5-193522. In the under body construction of the car disclosed in this publication, a transfer and a canister are disposed underneath the floor of the car body. The canister is placed along the retreating path of the transfer. A support construction is used, in which, at the time of a collision of the vehicle, the canister is displaced to the side of the retreating pathway of the transfer. A large volume canister, which uses the open space in back, is installed on the transfer underneath the floor of the car body.

In addition, another conventional canister attachment construction is disclosed in Japanese Laid-Open Patent Publication Number 8-142693. In the canister attachment construction disclosed in this publication, a canister is filled with adsorbent to sorb evaporated fuel generated inside a fuel tank. The canister is disposed at an approximately central region of a cross member that connects between the rear side members on either side of the vehicle. The canister is attached at a part with the least vibration, to prevent the wearing of the adsorbent within the canister.

In addition, another conventional canister attachment construction is disclosed in Japanese Laid-Open Patent Publication Number 8-230493. In this publication, there is disclosed a evaporated fuel treatment device for a vehicle, wherein a vehicle is equipped with a frame, which constructs the car body. The frame includes a pair of right and left side members, which construct the rear part of the car body. A cross member connects both side members together. An exhaust pipe, passing exhaust gas emitted from the engine, is positioned near the side members and cross member. A canister is disposed in the space surrounded by the side members, cross member, and exhaust pipe. Fuel is efficiently released from the adsorbent within the canister.

In addition, another conventional canister attachment construction is disclosed in Japanese Examined Patent Publication Number 2535338. The placement construction of the canister disclosed in this publication is in a region surrounded by right and left side members, the upright part of the rear floor panel, and a placing member in the car crosswise direction of a rear suspension. The canister is disposed on the opposite side of the exhaust tube, which has been displaced to one side of the car in the crosswise direction.

In addition, another conventional canister attachment construction is disclosed in Japanese Examined Utility Model Publication Number 6-8897. In the fuel tank canister disclosed in this publication, the fuel tank as well as the canister, which is attached and supported via brackets near the fuel tank, are placed on the underside of the floor within an area surrounded by a pair of rear frames, which are placed on the underside of the floor at the rear of a vehicle. A pair of cross members are placed between the rear frames. This arrangement is advantageous for protecting the canister.

In addition, another conventional canister attachment construction is disclosed in Japanese Laid Open Utility Model Publication 2557012. In the car canister attachment construction of this publication, the canister is attached to a spare tire mount at the rear of the car body. A pipe connected to the canister extends in the cross direction of the car body from the canister, in the forward direction of the car body along the rear side frame. The pipe is anchored to the spare tire mount by a first fastening member. At a certain distance in the front-rear direction of the car body, the pipe is fastened to the rear side frame or to a car body member near it by a second fastening member and a third fastening member. Between the second and third fastening members, a bending part is formed in the down direction of the car body. There is no danger of the pipe falling off of the canister while the vehicle is moving.

Referring to FIGS. 5, 6 and 7, conventional canister attachment constructions of a vehicle include a canister 124,224 attached via brackets to front wheel housing panels 152,252 inside an engine compartment on the vehicle front side.

A car body frame 104 of vehicle 102 has a construction including right and left side frames 110-2 (the disclosure of the left side frame is omitted). A subframe 112 is positioned between side frames 110-2. A plurality, preferably five, cross members 114-3, 114-4, and 114-5 (the disclosure of first and second cross members is omitted) are positioned between side frames 110-2.

On one side of the vehicle, preferably the left side, an exhaust pipe extends from the vehicle front side towards the vehicle rear side. A fuel tank 128 is positioned on the vehicle rear side. On the other side of the vehicle, preferably the vehicle right side, a vapor pipe 154 connects fuel tank 128 to canisters 124, 224. A fuel supply pipe 134 supplies fuel from fuel tank 128 to an injector (not shown). A fuel return pipe 136 returns fuel from the injector to fuel tank 128.

For the conventional canister described above, there are various constructions depending on the adsorption amount. For example, referring specifically to FIG. 6, there is a canister construction where the top of canister 124 connects to vapor pipe 154, which connects fuel tank 128 with canister 124. A purge hose connects canister 124 with the intake system of the internal combustion engine. The bottom of canister 124 connects to a canister air hose 132.

Referring specifically to FIG. 7, there is a canister construction where the top of canister 224 connects to a purge hose, which connects canister 224 with the intake system of the internal combustion engine. A canister air hose 232 also connects with the top of canister 224. The bottom of canister 224 connects to a vapor pipe, which connects the fuel tank with canister 224.

As a result, the length of the vapor pipe, which connects the fuel tank with the canister, becomes long. This construction makes it difficult for the evaporated fuel generated inside the fuel tank to be adequately sorbed and retained by the canister. This construction also makes it easier for the evaporated fuel to be released into the atmosphere when refueling and the like.

In addition, by attaching the canister to the inside of the engine room of a vehicle, the atmospheric temperature is raised, and the adsorptive performance of the canister may be reduced.

Furthermore, for example, when an external force acts from the front side of the vehicle, such as during a front end collision, the internal combustion engine moves towards the rear of the vehicle due to this external force. In order to prevent the front wheel housing panel from being pushed by the internal combustion engine and breaking the canister, there needs to be a procedure for strengthening the canister perimeter members or a procedure for having some other form of reinforcing members. This increases the overall manufacturing costs of the vehicle.

OBJECTS AND SUMMARY OF THE INVENTION

It is an object of the present invention to provide a canister attachment construction which overcomes the foregoing problems.

It is a further object of the present invention to provide a canister attachment construction wherein the length of a vapor pipe connecting the canister to the fuel tank of the vehicle is shortened.

It is another object of the present invention to provide a canister attachment construction wherein the canister is made larger in order to ensure an adequate fuel vapor adsorption.

It is yet another object of the present invention to provide a canister attachment construction wherein the canister is placed outside of the engine compartment of the vehicle, thereby minimizing the risk of reduced adsorptive function due to warming of the canister.

In order to eliminate the above problems, the present invention provides a canister attached to a vehicle. The canister is placed between a vapor pipe, which connects to the inside of a fuel tank of the vehicle, and a purge hose, which connects to an intake system of an internal combustion engine. The canister, by way of the vapor pipe, sorbs and retains evaporated fuel generated inside the fuel tank. The sorbed and retained fuel is released by air and supplied to the intake system of the internal combustion engine. A car body frame of the vehicle comprises a left and a right side frames and a plurality of cross members, which are placed between the side frames sequentially from the vehicle front to the vehicle rear. On one side of the vehicle, an exhaust pipe extends from the vehicle front to the vehicle rear. The canister is installed on the side opposite to the exhaust pipe on the vehicle. The canister is surrounded by a central cross member, which is positioned at an approximately central region of the car body frame, a cross member positioned behind the central cross member, and the side frame.

Briefly stated, the present invention provides a canister for the recovery of evaporated fuel in a fuel tank of a vehicle which is positioned in a central region of a vehicle. The vehicle body frame includes left and right side frames attached with a plurality of cross members. The canister is positioned behind a central cross member at a side opposite of an exhaust pipe running from the vehicle engine toward the rear of the vehicle. By attaching the canister in this location, a vapor pipe connecting the canister with the fuel tank is shortened, resulting in a more adequate recovers of evaporated fuel. Additionally, a canister placed in this location, is made larger, further increasing the adequacy of evaporated fuel recovery. Furthermore, as opposed to conventional canisters being located in the engine compartment, a canister located behind the central cross member is not effected by warming caused by the engine. The result is a canister having excellent performance in the recovery of evaporated fuel from the fuel tank of a vehicle.

According to an embodiment of the present invention, there is provided a canister attachment construction, comprising: a canister attached to a vehicle; a vehicle body frame including a left side frame and a right side frame; a plurality of cross members spanning between the left side frame and the right side frame; a vapor pipe connecting a fuel tank of the vehicle with the canister; a purge hose connecting the canister with an engine of the vehicle; adsorbing means inside the canister for adsorbing and retaining evaporated fuel generated inside the fuel tank; the canister being positioned under the vehicle in a region defined by the left side frame and the right side frame; and the region being to a rear of a central cross member of the plurality of cross members.

The above, and other objects, features and advantages of the present invention will become apparent from the following description read in conjunction with the accompanying drawings, in which like reference numerals designate the same elements.

DETAILED DESCRIPTION OF THE INVENTION

According to the canister attachment construction of the present invention, a canister is preferably attached to a car body frame of a vehicle on the vehicle right side, in a region surrounded by a central cross member, positioned approximately in the center of the car body frame of the vehicle, a cross member positioned behind this central cross member, and a side frame.

Figure 1:
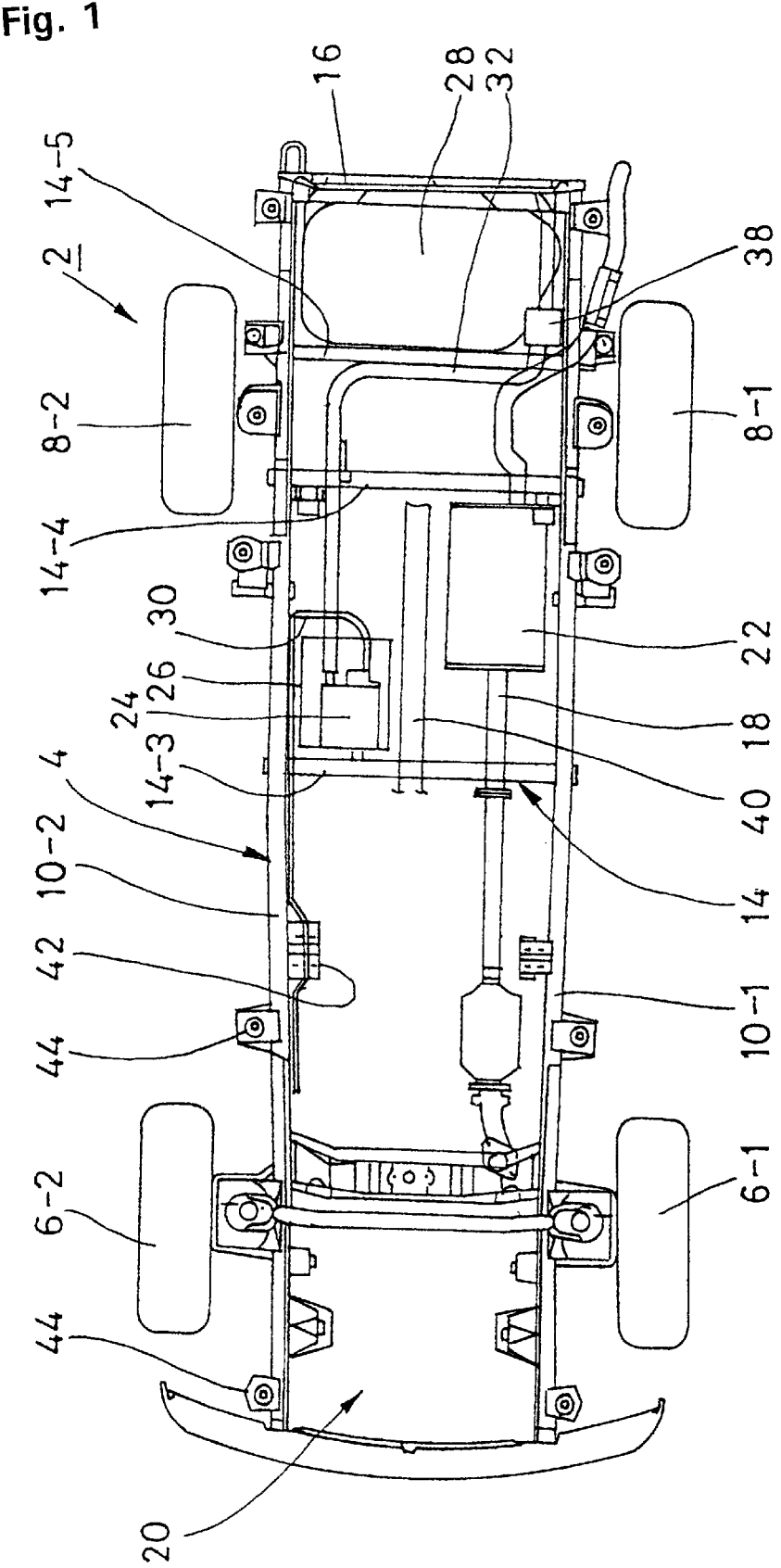
FIG. 1 is a schematic plan view of the car body frame of the vehicle of the embodiment of the present invention.
Figure 2:
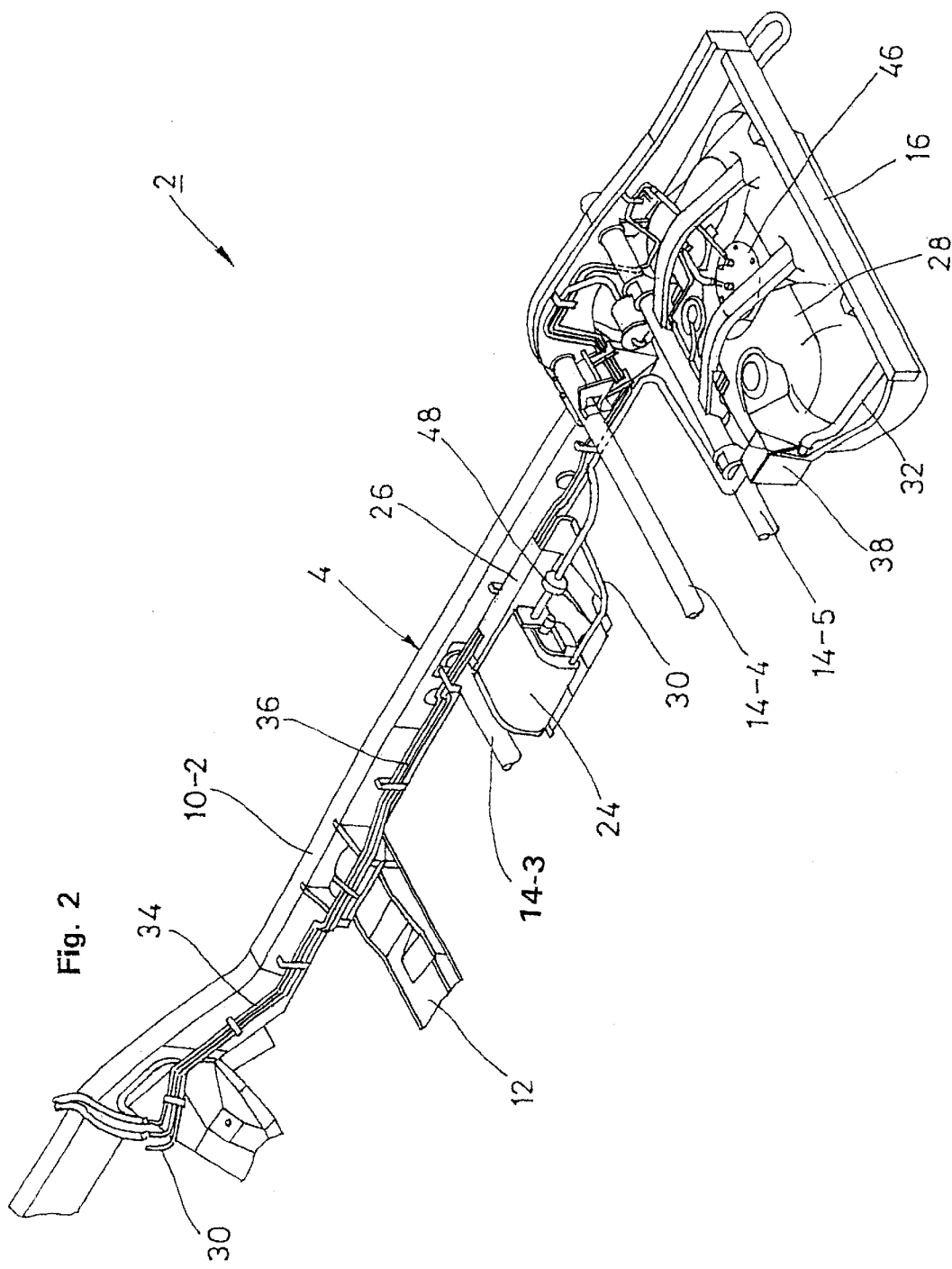
FIG. 2 is a schematic enlarged perspective view of the attachment of the canister.

Referring to FIGS. 1 and 2, a vehicle 2 includes a car body frame 4 mounted on a left front wheel 6-1, a right front wheel 6-2, a left rear wheel 8-1, and a right rear wheel 8-2.

Car body frame 4 of vehicle 2 includes a left side frame 10-1 and a right side frame 10-2 having a sub-frame 12 placed between left and right side frames 10-1 and 10-2. A plurality of cross members 14 are placed between left and right side frames 10-1 and 10-2. Preferably, five cross members 14 are included in vehicle 2, numbered sequentially from the vehicle front side to the vehicle rear side as 14-1 through 14-5. A tail member 16 spans left and right side frames 10-1 and 10-2 at the rear side of vehicle 2.

An exhaust pipe 18 is positioned on one side of vehicle 2, preferably on the vehicle left side. Exhaust pipe 18 extends from the vehicle front side towards the vehicle rear side.

An upstream end of exhaust pipe 18 connects with an exhaust system of an internal combustion engine (may be noted as "E/G"), which has an attached transmission (not shown). The internal combustion engine is placed inside an engine compartment 20 which is at the front side of vehicle 2 in front of third cross member 14-3. The downstream end of exhaust pipe 18 is positioned at the vehicle rear side. Exhaust pipe 18 has a muffler 22 at an intermediate position.

In this construction, canister 24 is placed on the side of vehicle 2 opposite exhaust pipe 18, preferably, on the vehicle right side. Canister 25 is positioned in a region surrounded by central cross member 14-3, which is positioned in an approximately central region of car body frame 4 of vehicle 2, cross member 14-4, positioned behind central cross member 14-3, and left and right side frames 10-1 and 10-2.

Described in detail, cross member 14 includes five, first through fifth, cross members 14-1, 14-2, 14-3, 14-4, and 14-5 (disclosure of first and second cross members 14-1 and 14-2 are omitted), which are placed sequentially from the vehicle front side to the vehicle rear side. Central cross member 14-3 is positioned in an approximately central region of car body frame 4 of vehicle 2. The cross member positioned behind third cross member 14-3 is fourth cross member 14-4.

The internal combustion engine (not shown) and the transmission (not shown) are placed forward of central cross member 14-3. Canister 24 is placed behind central cross member 14-3.

On the right side of vehicle 2 and in a region surrounded by third and fourth cross members 14-3 and 14-4, and left and right side frames 10-1 and 10-2, canister 24 is installed by way of a canister bracket 26. Canister 24 is separated from muffler 22 of exhaust pipe 18. At the rear side of vehicle 2, canister 24 is positioned forward of fuel tank 28, which is loaded between fifth cross member 14-5 and tail member 16.

In other words, canister bracket 26 attaches to third cross member 14-3 and side frame 10-2. In addition, the outer dimensions of canister bracket 26 is formed larger than canister 24. Canister 24 is supported by canister bracket 26.

In addition, canister 24 has a vapor pipe (not shown), which connects to the inside of fuel tank 28. A purge hose 30 connects with the intake system of the internal combustion engine (not shown). A canister air hose 32 introduces atmospheric air into canister 24.

Purge hose 30 connects to canister 24 on the vehicle rear side. From the connecting site, purge hose 30 goes around to the side of side frame 10-2 on the right side of vehicle 2. Next, purge hose 30 is placed along the inside of side frame 10-2 on the right side of vehicle 2. In addition, on the inside area of side frame 10-2, a fuel supply pipe 34, which sends fuel from fuel tank 28 to an injector (not shown), and a fuel return pipe 36, which sends fuel from the injector back to the fuel tank, are positioned.

The air releasing end of canister air hose 32 is inserted and connected to a region on car body frame 4 of vehicle 2 with a significant height, for example tail member 16.

Furthermore, canister air hose 32 has an air filter 38 at an intermediate region. When fuel tank 28 is loaded onto the vehicle rear side, air filter 38 is placed in the region surrounded by fuel tank 28, left side frame 10-1, and fifth cross member 14-5.

A propeller shaft 40, a sub-frame attachment piece 42, a body mount piece 44, a fuel pump 46, and an air cut valve 48, are also included in vehicle 2.

When attaching canister 24 to car body frame 4 of vehicle 2, canister 24 is installed with canister bracket 26 on the right side of vehicle 2 in the region surrounded by third and fourth cross members 14-3 and 14-4 and left and right side frames 10-1 and 10-2.

Compared to the attachment position of fuel tank 28, which is loaded in the rear side of vehicle 2, between fifth cross member 14-5 and tail member 16, canister 24 is positioned toward the front of the attachment position of fuel tank 28.

Furthermore, purge hose 30 of canister 24 connects at the vehicle rear side of canister 24. From the connection site, purge hose 30 goes around to side frame 10-2, on the right side of vehicle 2. Purge hose 30 is then placed along the inside of side frame 10-2 on the right side of vehicle 2.

Fuel supply pipe 34 supplies fuel from fuel tank 28 to an injector (not shown). Fuel returning pipe 36 returns fuel from the injector to fuel tank 28. Both fuel supply pipe 34 and fuel return pipe 36 are placed in the interior region of right side frame 10-2.

Furthermore, the end of canister air hose 32 that is open to the atmosphere is inserted and connected to a region on car body frame 4 of vehicle 2 with a significant height, for example tail member 16.

Canister air hose 32 has an air filter 38 at an intermediate position. When fuel tank 28 is loaded onto the vehicle rear side, air filter 38 is placed in the region surrounded by fuel tank 28, left side frame 10-1, and fifth cross member 10-5.

Canister 24 is installed with canister bracket 26 on the right side of vehicle 2 in a region surrounded by third and fourth cross members 14-3 and 14-4, and left and right side frames 10-1 and 10-2. The pipe length of the vapor pipe, which connects canister 24 and fuel tank 28, is shortened. The evaporated fuel generated inside fuel tank 28 is more readily sorbed and retained by canister 24. In addition, when refueling and the like, the evaporated fuel is not easily released into the atmosphere. This construction has practical advantages.

Furthermore, the space in which canister 24 is installed is large compared to that of the prior art. As a result, canister 24 can be made large in order to increase the adsorption amount. An adequate adsorption amount is ensured, and there is improved ease of use.

Furthermore, because canister 24 is not installed inside engine compartment 20 of vehicle 2, the inside of engine compartment 20 is simplified. In addition, there is no danger of canister 24 being heated, resulting in reduced adsorptive capability. This is a practical advantage.

Furthermore, if, for example, an external force acts from the front of the vehicle, even if the internal combustion engine is moved towards the vehicle rear due to the external force, there is no danger of canister 24 being pushed and breaking due to the external force. A procedure for preventing the breaking of the canister, or in other words a procedure for strengthening the canister perimeter members or a procedure for having other reinforcing members, becomes unnecessary. Low costs are maintained, resulting in a significant economic advantage. Even if an external force acts from the vehicle rear side, canister 24 is interposed between right rear wheel 8-2 and the rear differential (not shown), minimizing the danger of canister 24 breaking.

Vehicle 2 has the internal combustion engine and transmission placed in front of central cross member 14-3, and canister 24 placed behind central cross member 14-3. As a result, even if an external force acts from the vehicle front side, and even if the internal combustion engine moves towards the vehicle rear due the external force, third cross member 14-3 hinders the movement of the internal combustion engine. There is no danger of canister 24 being pushed and broken by the internal combustion engine. This is a practical advantage.

Furthermore, when supporting canister 24, canister bracket 26, attached to central cross member 14-3 and side frame 10-2, has an outer measurement that is greater than canister 24. As a result, because the strength of canister bracket 26 is high, when an external force acts from the vehicle front side, the breaking of canister 24 is prevented. The occupied area of canister bracket 26 is large, thereby preventing damage to canister 24 from flying rocks from below.

Furthermore, by inserting and connecting the end that is open to the air of canister air hose 32 to a region which is high on car body frame 4 of vehicle 2, for example, to tail member 16, even though water may enter into right and left side frames 10-1 and 10-2, there is no danger of water entering inside tail member 16. The entering of water and dust into canister 24 is reliably prevented.

Furthermore, by placing air filter 38 in a region surrounded by fuel tank 28, left side frame 10-1, and fifth cross member 14-5, air filter 38 and tail member 16 are connected by a straight hose. The piping is simplified, and this is a practical advantage.

Having described preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims.

Figure 3:
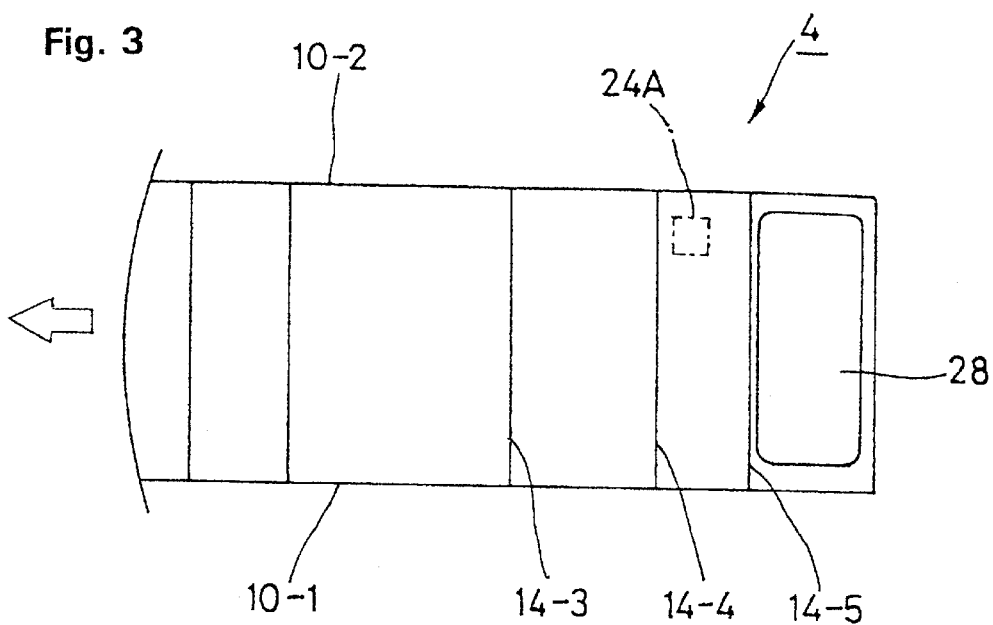
FIG. 3 is a schematic plan view of the car body frame showing a first special construction of the present invention.

For example, in one embodiment of the present invention, when attaching canister 24 to car body frame 4 of vehicle 2, canister 24 is installed on the right side of the vehicle, in a region surrounded by third and fourth cross members 14-3 and 14-4 and left and right side frames 10-1 and 10-2. However, referring to FIG. 3, as shown by the alternating long and short dashed line, canister 24A can have a special construction where it is installed on the right side of the vehicle, in a region surrounded by fourth and fifth cross members 14-4 and 14-5 and left and right side frames 10-1 and 10-2.

In this case, similar to the embodiment described above, the pipe length of the vapor pipe, which connects canister 24A and fuel tank 28, is shortened further. The space in which canister 24A is installed is larger than that of the prior art. As a result, canister 24A can be made larger in order for increased adsorption. Because canister 24A is not placed inside the engine compartment, the engine compartment is simplified. There is no danger of canister 24A being heated and having a reduced adsorptive performance. In addition, even if an external force acts on the vehicle front side or on the vehicle rear side, there is no danger of canister 24A being pushed and breaking. This construction has all of these remarkable effects.

Figure 4:
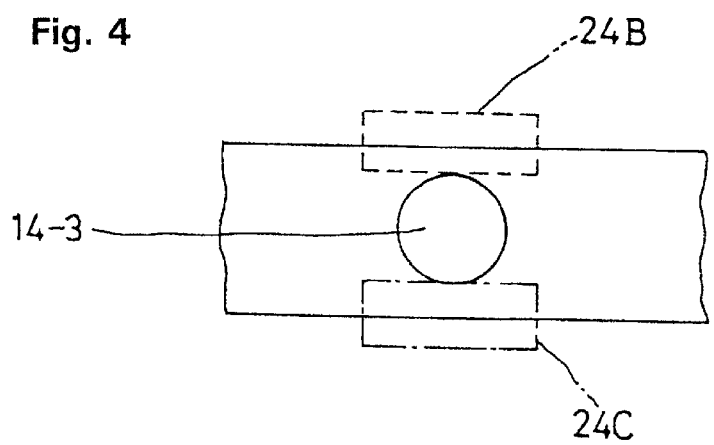
FIG. 4 is a schematic enlarged cross-section of the third cross member showing a second special construction.
Figure 5:
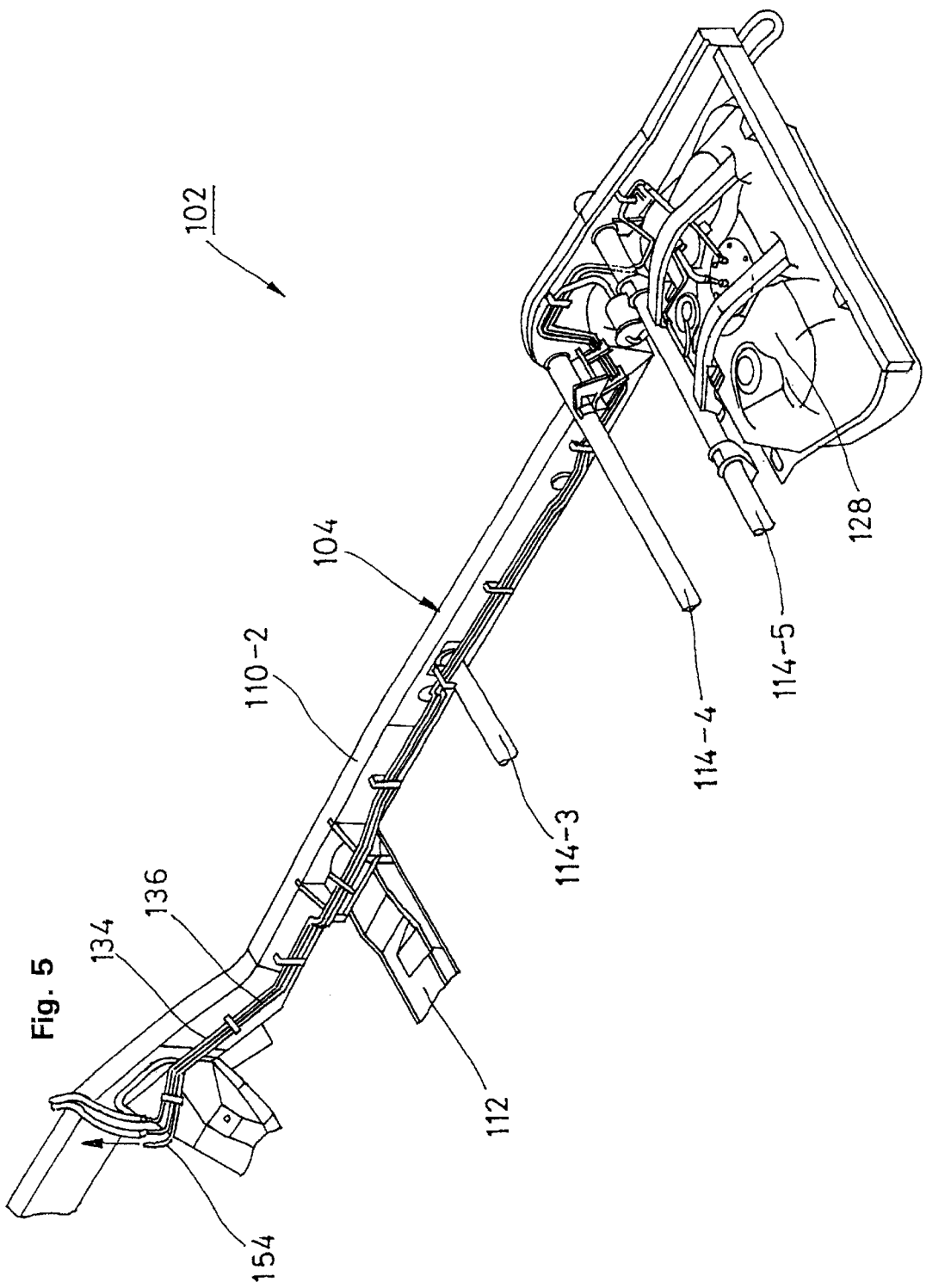
FIG. 5 is a schematic enlarged perspective view of the canister attachment of the prior art.
Figure 6:
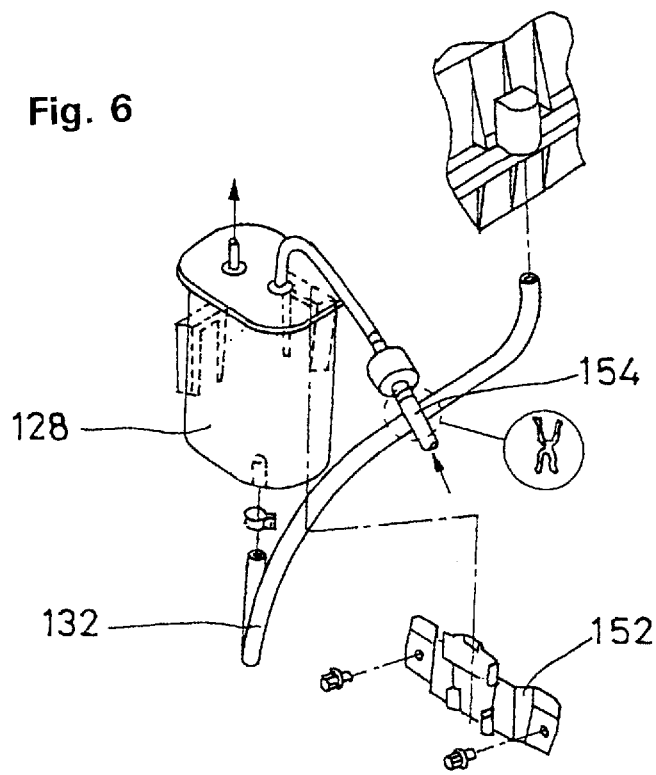
FIG. 6 is a schematic enlarged perspective view showing the canister attachment of a first example.
Figure 7:
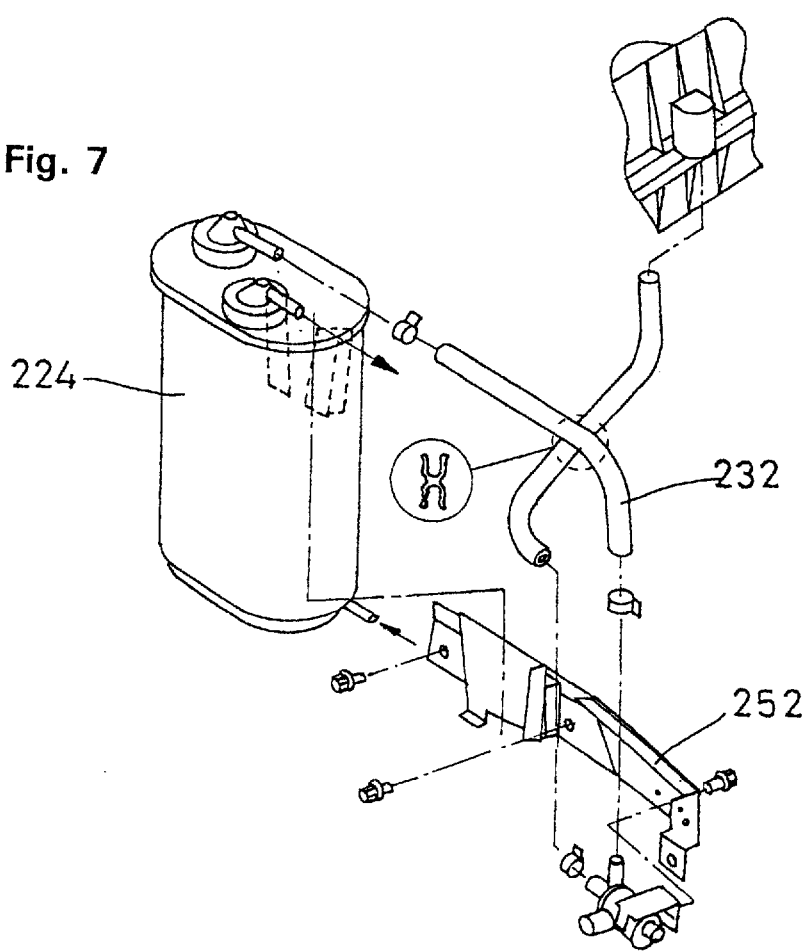
FIG. 7 is a schematic enlarged perspective view showing the canister attachment of a second example.

Referring to FIG. 4, as shown by the dashed line or the alternating long and short dashed line, special constructions of placing canisters 24B and 24C on top of or below third cross member 14-3 are also possible.

Having canisters 24B and 24C placed in a region above or below third cross member 14-3, canisters 24B and 24C are formed in a flattened shape. Or, when forming the canister, the shape of the surface that contacts third cross member 14-3 is formed in a curved surface shape.

In this case, similar to the embodiment described above, the pipe length of the vapor pipe, which connects the canister with the fuel tank, is shortened. In addition, when forming a flattened shape canister, it is possible to make the canister large in order to increase the adsorption amount of the canister. The canister is not placed inside the engine compartment, and the inside of the engine compartment is simplified. There is no danger of the canister being heated and having reduced adsorptive performance. Even if an external force acts on the vehicle front or rear side, there is no danger of the canister being pushed and breaking. This construction has all of these remarkable effects.

The present invention which has been described in detail above is a canister attachment construction, wherein a canister is attached to a vehicle. The canister is placed between a vapor pipe, which connects to the inside of a fuel tank of the vehicle, and a purge hose, which connects to an intake system of an internal combustion engine. The canister, by way of the vapor pipe, sorbs and retains evaporated fuel generated inside the fuel tank. The sorbed and retained fuel is released by air and supplied to the intake system of the internal combustion engine. A car body frame of the vehicle includes a left and a right side frame, a plurality of cross members placed between the side frames. On one side of the vehicle, there is an exhaust pipe, extending from the vehicle front to the vehicle rear. The canister is installed on a side opposite the exhaust pipe on the vehicle in a region surrounded by a central cross member, which is positioned at an approximately central region of the car body frame, a cross member positioned behind the central cross member, and the side frames. As a result, the pipe length of the vapor pipe, which connects the canister with the fuel tank, is shortened.

With this construction, the evaporated fuel, which is generated inside the fuel tank, is more readily sorbed and retained in the canister. In addition, the evaporated fuel is less readily released into the atmosphere during refueling and the like. This is a practical advantage. Furthermore, the space in which the canister is installed is larger than that of the prior art. As a result, the canister can be made larger in order to increase the adsorption amount. An adequate adsorption amount is thereby ensured. The ease of use is improved. Furthermore, because the canister is not placed inside the engine compartment, the inside of the engine compartment is simplified, resulting in minimal danger of the canister being heated and having a reduced adsorptive performance. These are practical advantages. Furthermore, even if an external force acts on the vehicle front or rear, there is no danger of the canister being pushed and breaking. Procedures for preventing the breaking of the canister, in other words procedures for increasing the strength of the canister perimeter members, or procedures for having other reinforcing members, are not necessary. Low costs are maintained, resulting in a significant economic advantages.

What is claimed is:

1. A canister attachment construction, comprising:

a canister attached to a vehicle;

a vehicle body frame including a left side frame and a right side frame;

a plurality of cross members spanning between said left side frame and said right side frame;

a vapor pipe connecting a fuel tank of said vehicle with said canister;

a purge hose connecting said canister with an engine of said vehicle;

adsorbing means inside said canister for adsorbing and retaining evaporated fuel generated inside said fuel tank;

said canister being positioned under said vehicle in a region defined by said left side frame and said right side frame;

said region being forward of said fuel tank and behind said engine;

said region further being to a rear side of a central cross member of said plurality of cross members;

said region being in front of a cross member;

said cross member adjacent to said central cross member and to said rear of said central cross member;

said region further being adjacent at least one of said left side frame and said right side frame;

a canister bracket supporting said canister in said region; and said canister bracket fixed to both said rear side of said central cross member and with said one side frame, whereby recovery of evaporated fuel is maximized by reducing the length of said vapor pipe, canister temperature is reduced and recovery increased through separation from said engine, and said canister is fully supported and can thus be made larger and more efficient.

2. A canister attachment construction according to claim 1, further comprising:

adsorbed fuel releasing means for releasing adsorbed fuel from said adsorbing means to said engine; and said adsorbed fuel releasing means including a canister air hose, allowing air to enter said canister.

3. A canister attachment construction according to claim 2, further comprising:

an air filter in said canister air hose; and an open end of said canister air hose being attached to a portion of said vehicle having a height greater than a height of said canister, whereby water and dust entry into said canister air hose is minimized.

4. A canister attachment construction according to claim 3, wherein:

said portion of said vehicle is at a tail section of said vehicle.

5. A canister attachment according to claim 1, wherein:

said plurality of cross members includes first through fifth cross members sequentially located from a front end of said vehicle to a rear end of said vehicle;

said central cross member being said third cross member;

said engine being positioned in front of said third cross member;

said canister being positioned between said third cross member and said fourth cross member; and said canister being positioned on a rear side of said third cross member.

6. A canister attachment construction according to claim 5, further comprising:

a canister bracket supporting said canister; and said canister bracket having outer dimensions larger than outer dimensions of said canister.

7. A canister attachment construction according to claim 6, wherein:

said canister bracket being attached to said third cross member; and said canister bracket being attached to one of said left side frame and said right side frame.

8. A canister attachment construction according to claim 6, wherein:

said exhaust pipe extends from said engine to said rear end of said vehicle on a left side of said vehicle; and said canister bracket being attached to said right side frame.

* * * * *